Figure 1:
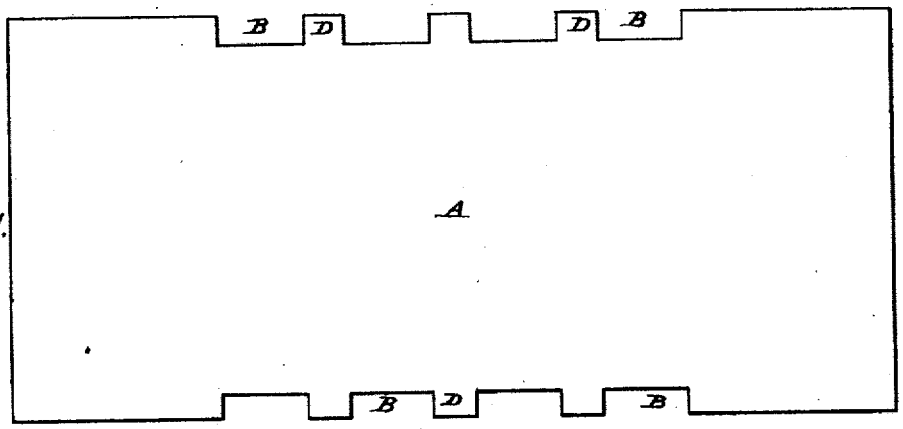

No. 824,302. PATENTED JUNE 26, 1906.
W. H. KLAUER.
METHOD OF MAKING SHEET METAL ELBOWS.
APPLICATION FILED SEPT. 19, 1905.

3 SHEETS—SHEET 1.

WITNESSES:
B. Kennedy
W. B. Keogh

INVENTOR.
BY William H. Klauer
M. M. Cady
ATTORNEY.

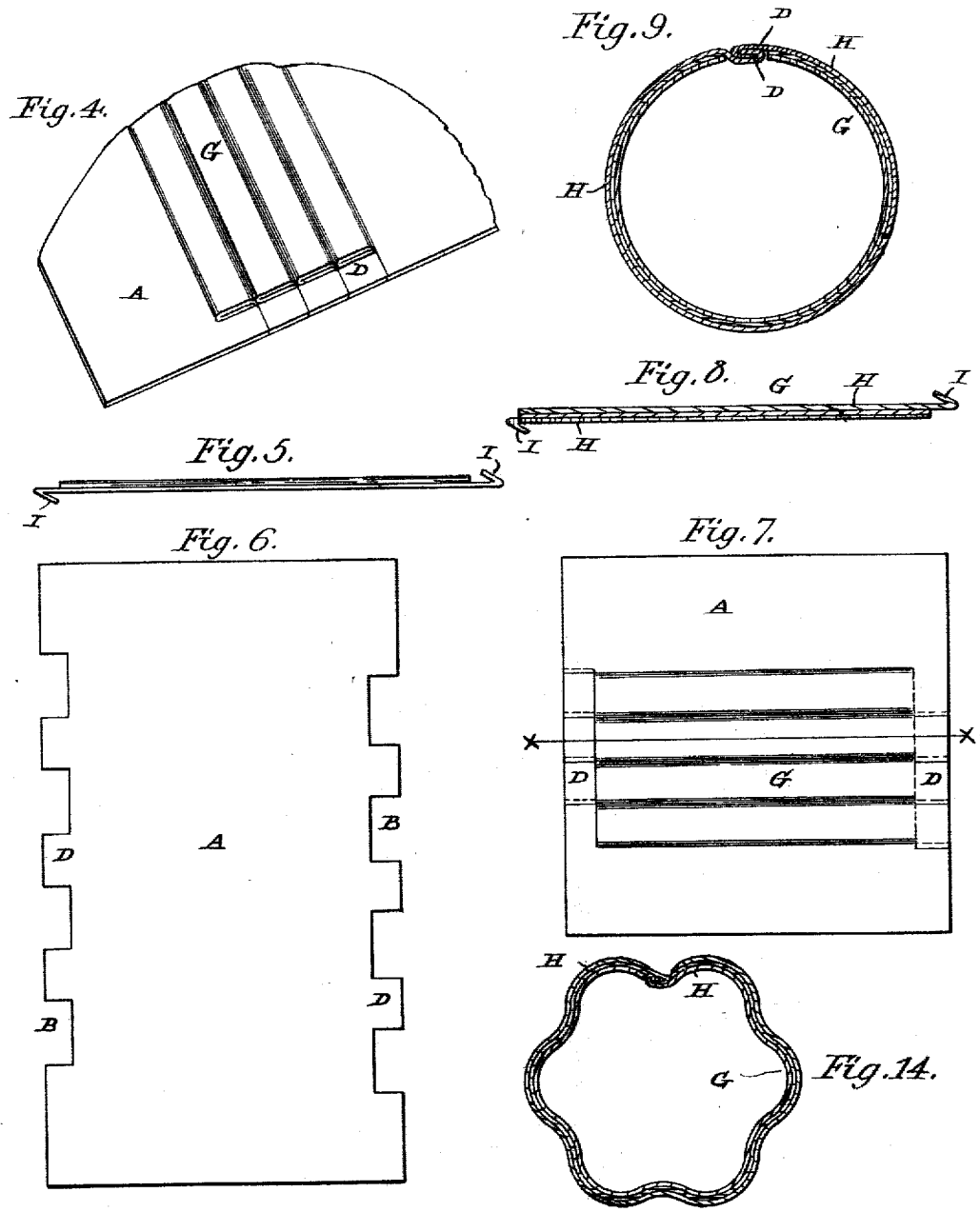

No. 824,302. PATENTED JUNE 26, 1906.
W. H. KLAUER.
METHOD OF MAKING SHEET METAL ELBOWS.
APPLICATION FILED SEPT. 19, 1905.

3 SHEETS—SHEET 3.

WITNESSES:
B. Kennedy
W. B. Keogh

INVENTOR.
BY William H. Klauer
M. M. Cady
ATTORNEY.

UNITED STATES PATENT OFFICE.

WILLIAM H. KLAUER, OF DUBUQUE, IOWA.

METHOD OF MAKING SHEET-METAL ELBOWS.

No. 824,302.　　　Specification of Letters Patent.　　　Patented June 26, 1906.

Application filed September 19, 1905. Serial No. 279,203.

*To all whom it may concern:*

Be it known that I, WILLIAM H. KLAUER, a citizen of the United States, residing at Dubuque, in the county of Dubuque and State of Iowa, have invented certain new and useful Improvements in Methods of Making Sheet-Metal Elbows, of which the following is a specification.

In the manufacture of sheet-metal tubes and elbows, especially those that are cut out of sheet metal and then plaited or folded before they are formed into a tube or elbow, great difficulty has been experienced in forming the seams and locking the edges of the blank together to form the tube, owing to the many thicknesses of the plaited or folded metal where the edges are joined. Further, it has been exceedingly difficult, if not practically impossible, to corrugate a sheet-metal elbow, especially along the seam on the concave surface or opposite on the convex surface, and on account of these difficulties many of the sheet-metal elbows are united together by lapping the edges of the blank and securing them together in some convenient manner to form the elbow, then corrugating the ends and sides and leaving the parts along the seam or opposite on the convex surface without corrugation; but this mode of manufacturing plaited sheet-metal elbows is inconvenient, and the elbow is not as durable or convenient in use.

To avoid these various difficulties and to provide means whereby the plaited elbows may be formed with a seam of no unusual thickness and still maintain its rigidity and provide means whereby the entire elbow may be corrugated are the leading objects of my invention.
It consists, essentially, in first cutting out of a sheet of metal a blank of the length and size required to form the elbow, cutting recesses at intervals along the opposite edges of the blank, forming folds or plaits crosswise of the blank with one sheet of the fold having an uncut edge thereon and forming a part of the plait, and then uniting and locking the uncut edges of the blank together to form the seam, and subsequently forming it into an elbow.

The following specification will give a more perfect understanding of the invention, together with the manner of construction and mode of uniting the parts together, when taken in connection with the drawings accompanying the same and forming a part hereof.

Figure 2:
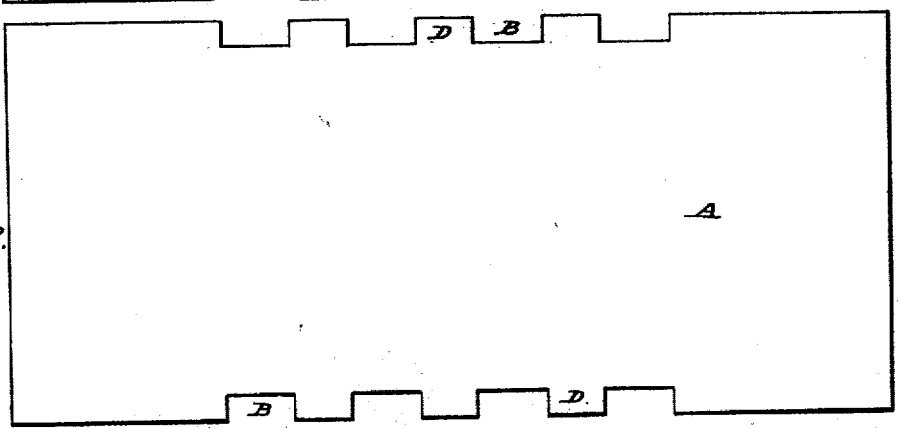
Figure 3:
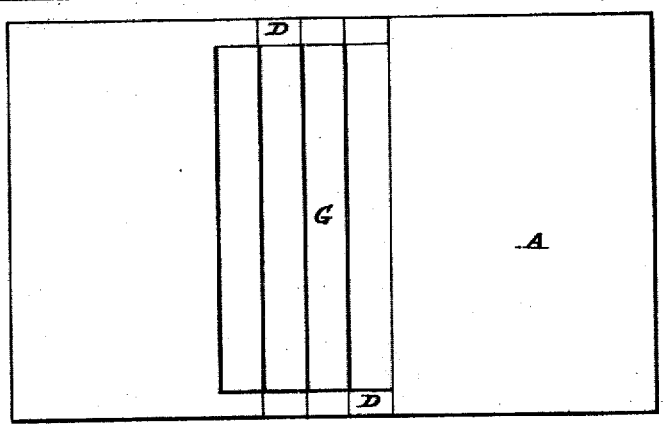
Figure 10:
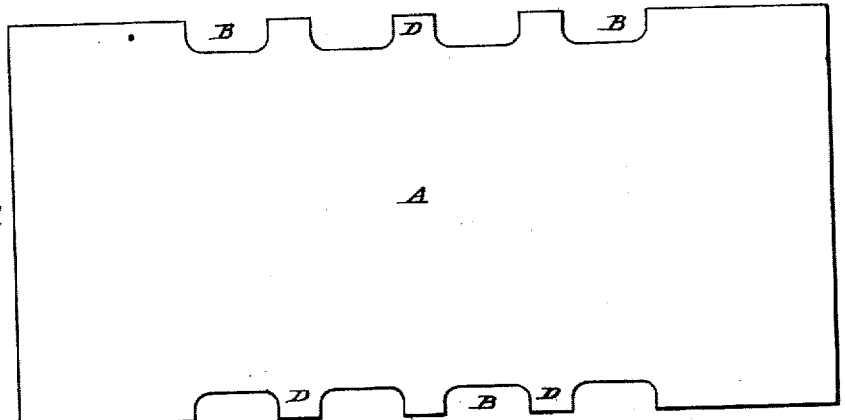
Figure 11:
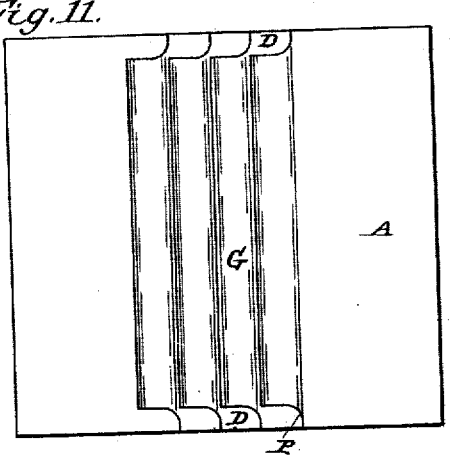
Figure 13:
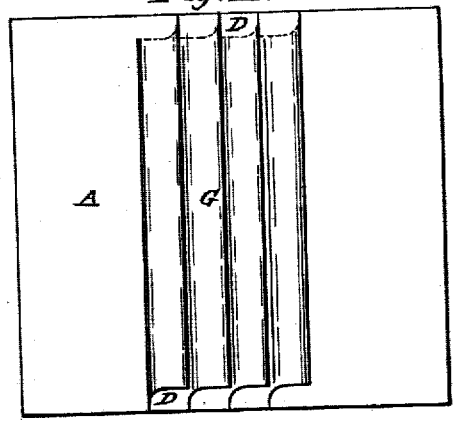
Figure 12:
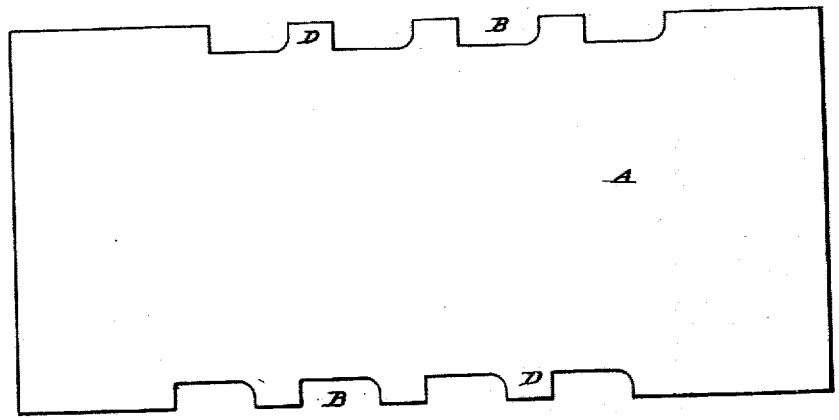

Figure 1 is a plan view of a blank with the recesses cut out of its opposite edges, said recesses being twice the size of the uncut parts between the recesses and cut from the same plane in the opposite edges of the blank. Fig. 2 is a plan view of the blank with the recesses cut out, said recesses being a trifle longer than the remaining portions of the edges of the blank between the recesses. Fig. 3 is a plan view of the blank shown in Fig. 1 after it has been folded or plaited, showing the uncut edges just in contact with each other and forming a continuous edge of one thickness. Fig. 4 is a perspective view taken from one side of the blank shown in Fig. 3 after it is folded or plaited with parts cut away. Fig. 5 shows an end view of Fig. 3 after the hooks which constitute the lock are formed thereon. Fig. 6 is a plan view of a blank wherein the recesses are cut out from different planes or parts in the opposite edges. Fig. 7 is a plan view of the blank shown in Fig. 6 after it has been plaited, showing that the uncut edges of the blank lap a trifle over one another. Fig. 8 is a sectional view through line $x\ x$ of Fig. 7 after the edges have been bent into position for locking. Fig. 9 is the same view as Fig. 8 after the seam has been found. Fig. 10 is a plan view of a blank with both the inner corners of the recesses cut out rounded and the recesses cut from the same parts or planes in the opposite edges of the blank. Fig. 11 is a plan view of the blank shown in Fig. 10 after it has been plaited. Fig. 12 is a plan view of a blank with the recesses cut out, but leaving one of the inner corners of each recess rounded, the other rectangular, and the recesses cut from different portions in the opposite edges of the blank. Fig. 13 is a plan view of the blank shown in Fig. 12 after it has been folded or plaited. Fig. 14 is a cross-section taken through the center of a complete corrugated elbow made from the blank shown in Fig. 1.

Like letters of reference denote corresponding parts in each of the figures.

Referring to the drawings, A designates a blank. Along its longitudinal edges are cut out the same number of preferably rectangular notches or recesses B as the number of plaits or folds desired or necessary for forming the elbow, leaving intact the uncut parts or projections D of the blank. The blank with the recesses B therein is then placed in a folding or plaiting machine, where the blank is folded into the plaits G of three thicknesses with two of the folds shorter than the third, being folded from the blank where the recesses of the blank have been cut out and one plait H folded from the blank with the uncut portion D still remaining, as shown in Fig. 4.

In the blank shown in Fig. 1 it will be noticed that the recesses B are of double the width of the uncut portions D, so that when the blank is subsequently plaited the uncut portions D will be of the width of one fold of the plait, and these uncut folds or portions will just fill the space along the edges of the plaited blank and form a continuous edge on both sides of the blank, as shown in Figs. 3 and 4. It will be observed that each plait G is of three thicknesses throughout its entire length, except at the ends, where it is of only one thickness of the metal. This blank with the plaits thus formed thereon is placed in a machine which bends the longitudinal uncut or remaining edges of the blank into hooks I, as shown in Figs. 5 and 8. The hooks are then united and locked together, and the seam is formed in the usual manner. It will be seen in this seam that there is only the usual thickness of metal of a seam that is formed in the ordinary manner of forming tubes without plaits or folds, as shown in Fig. 9.

In Fig. 2 the longitudinal recesses B are only a trifle longer than the uncut edges or projections D. The object of this is to permit the parts D to lap a trifle over each other, as shown in Fig. 7, so that when the blank is bent into a tube and the seam locked and then formed into an elbow there will be no open spaces in the seam where the uncut portions come together.

In Fig. 6 it will be noticed that the recesses B are not formed in the edges of the blank exactly opposite of each other; but the center of the uncut projection D upon one edge is in line with one side of the recess on the opposite edge of the blank, so that when the blank is plaited one of the folds with the projection D thereon will be upon one side of the plait and the projection D of the opposite edge of the blank will be upon the opposite side of the plait, as shown in Figs. 7 and 8, and these projections will also lap a trifle.

In Fig. 10 the recesses are cut out with both of the inner corners rounded, and they are also cut from the same plane on the opposite edges of the blank. Fig. 11 shows this blank after it has been plaited, in which it will be noticed at the end of the plaits the rounded portions P of the projections D will lap a trifle over the contiguous projections, so that when the plaited blank is formed into an elbow there will be no open spaces or holes at the edges of the seam.

In Fig. 12 one of the inner corners of the recesses is rounded and the other rectangular, and when it is plaited it will present the appearance shown in Fig. 13, and when it is formed into an elbow there will be no open spaces or holes in the edges of the seam.

Fig. 14 shows a cross-section through the center of a finished corrugated elbow, by which it will be seen that there is only the one thickness on the side of each edge to form the hook or lock and that when locked together there are only four thicknesses of the metal, the same as though it had been made without plaits. An elbow formed with its seam in this manner can be corrugated along the seam as well as in any other part of the elbow and when complete will be corrugated in every part the same as though it were a plain tube without plaits. It will be observed also that it is not essential to cut out any particular sized recess B or at any particular place along the longitudinal edges of the blank. It is only necessary that when they are folded or plaited the ends of each plait shall be of less thickness than the same plait is at the center, and this may be done in numerous ways. It will also be observed that when the plaits are drawn out to form the curve of the elbow there will be no particular strain upon the seam, but that it will b ceedingly rigid, being reinforced by the plaits and still not over thick at the seam.

Having now described my invention, what I claim is—

1. The method of forming plaited sheet-metal elbows, which consists in removing portions of the edges of a blank, folding or plaiting the blank, uniting the unremoved edges of the blank, and then forming the united blank into an elbow.

2. The method of forming plaited sheet-metal elbows, which consists in cutting out rectangular recesses from the opposite edges of the blank, plaiting or folding the blank, uniting and locking the uncut edges of the blank, and then forming it into an elbow.

3. The method of forming plaited sheet-metal elbows, which consists in cutting out a recess in different planes in the opposite edges of a blank, plaiting or folding the blank, uniting the uncut edges of the blank, and then forming the blank into an elbow.

4. The method of forming plaited sheet-metal elbows, which consists in cutting out rectangular recesses with rounded inner corners from the opposite edges of a blank, plaiting or folding the blank, uniting and locking the uncut edges of the blank, and then forming the blank into an elbow.

5. The method of manufacturing plaited sheet-metal elbows, which consists in cutting irregular recesses from the edges of a blank, plaiting or folding the blank, uniting and locking the unremoved edges of the blank, and then forming it into an elbow.

6. The method of forming plaited sheet-metal elbows, which consists in removing portions of the opposite edges of a blank, plaiting or folding the blank with each fold of three thicknesses of metal one thickness of which projects beyond the edge of the other two and leaving the opposite edges of the blank with only one thickness of metal, uniting the unremoved edges of the blank, and then forming it into an elbow.

7. The method of manufacturing plaited sheet-metal elbows, which consists in removing portions of the opposite longitudinal edges of a blank, plaiting or folding the blank and leaving a continuous edge of one thickness along the opposite edges of the blank, locking the unremoved edges of the blank, and forming the locked blank into an elbow.

In testimony whereof I affix my signature in presence of two witnesses.

WILLIAM H. KLAUER.

Witnesses:
M. M. CADY,
R. W. SIMPSON.